(12) United States Patent
Culpepper et al.

(10) Patent No.: US 6,923,101 B2
(45) Date of Patent: Aug. 2, 2005

(54) CONTINUOUS LOG BUCKING SAW SYSTEM AND METHOD

(75) Inventors: T. Mark Culpepper, Lonsdale, AR (US); Wayne A. Horman, Jessieville, AR (US); John M. Hunnicutt, Benton, AR (US)

(73) Assignee: Mid-South Engineering Co., Inc, Hot Springs, AR (US)

( * ) Notice: Subject to any disclaimer, the term of this patent is extended or adjusted under 35 U.S.C. 154(b) by 176 days.

(21) Appl. No.: 10/144,006

(22) Filed: May 10, 2002

(65) Prior Publication Data
US 2003/0209116 A1 Nov. 13, 2003

(51) Int. Cl.⁷ .............................. B26D 5/20; B26D 1/56
(52) U.S. Cl. .................... 83/75.5; 83/76.8; 83/287; 83/368; 83/365; 83/367; 83/371; 83/471.2; 83/489; 83/490; 83/491; 83/289; 83/298; 83/318; 83/311; 83/734; 83/315
(58) Field of Search ................. 144/379, 402, 144/336, 385; 83/37, 38, 287, 295, 298, 300, 303, 315, 318, 326, 339, 353, 354, 365, 368, 369, 371, 556, 734, 75.5, 647, 618, 558, 289, 76.8, 76.9, 76.7, 367, 485, 489, 490, 991, 471.2, 311

(56) References Cited

U.S. PATENT DOCUMENTS

| | | | |
|---|---|---|---|
| 2,079,974 A | * 5/1937 | Traut | 72/203 |
| 2,682,307 A | * 6/1954 | Overman | 83/318 |
| 3,174,373 A | * 3/1965 | Gensman | 83/110 |
| 3,537,348 A | * 11/1970 | Robins et al. | 83/319 |
| 3,919,906 A | * 11/1975 | Law | 83/294 |
| 4,408,510 A | * 10/1983 | Reuter | 83/869 |
| 4,468,993 A | * 9/1984 | McCown et al. | 83/112 |
| 4,616,542 A | * 10/1986 | Hards | 83/155 |
| 4,640,160 A | * 2/1987 | Hards | 83/75.5 |
| 5,315,907 A | * 5/1994 | Biagiotti | 83/38 |
| 5,522,292 A | * 6/1996 | Biagiotti | 83/38 |
| 5,579,671 A | * 12/1996 | Bowlin | 83/75.5 |
| 6,032,564 A | * 3/2000 | Bowlin | 83/508.3 |
| 6,158,318 A | * 12/2000 | Niemela | 83/298 |

* cited by examiner

*Primary Examiner*—Boyer D. Ashley
(74) *Attorney, Agent, or Firm*—Joe D. Calhoun

(57) ABSTRACT

A high-throughput, high-end-product-recovery, lineal log bucking device featuring continuous stem travel during the cutting process by using a simple and efficient machinery design for economy of equipment and monies. The apparatus includes: (1) a saw for cutting stem into logs; and (2) apparatus for accelerating the carrier up to the speed of the stem conveyor(s), maintaining the speed during the cut, decelerating the carrier, and then returning the carrier to its starting point.

9 Claims, 8 Drawing Sheets

CONTINUOUS LOG BUCKING SAW SYSTEM AND METHOD

CROSS REFERENCES TO RELATED APPLICATIONS

Not applicable.

FEDERALLY SPONSORED RESEARCH OR DEVELOPMENT

Not applicable.

MICROFICHE APPENDIX

Not applicable.

BACKGROUND OF THE INVENTION (1) Field of the Invention.

The invention disclosed herein is an automatic tree stem cutting apparatus which is designed to rapidly process substantially tree length stems into logs, poles or other segments for further processing in pole mills, sawmills, plywood plants and the like. This invention relates to a high-speed continuous-feed log bucking system; more particularly, the invention disclosed herein relates to an apparatus for precise dissection of tree trunk stems continuously traveling lineally. The invention described herein essentially executes a cutting pattern on a trunk stem "on the fly", by receiving input or cut-positioning directives concerning the unique physical characteristics of the workpiece stem traveling lengthwise atop the lineal conveyor(s), the saw carrier traveling in like direction obliquely and parallel above the stem until the correct cut point and matching speed is realized, bisecting the correct cut site while the stem remains traveling.

(2) Description of the Related Art Including Information Disclosed Under 37 C.F.R. 1.97 and 1.98.

Trees grow in an essentially infinite variety of dimensions and configurations. There is great diversity in physical characteristics such as (for example) the longitudinal lengths and diameters of tree trunks, limb numbers and positioning, trunk curvature and bifurcation, and the presence of knots, depressions or other irregularities. Processing a tree from harvestable timber to finished end product often includes several steps requiring a high degree of precision, accompanied by great flexibility due to the variation and diversity of the characteristics of each workpiece stem. After the tree is felled, many of the smaller limbs are removed, and the remaining trunk stem is transported (along with other trunk stems) to an area to be "bucked". The modern "bucking" process involves analyzing each individual unique stem for the optimum manner of segmenting it to maximize the yield of wood product(s) desired.

Analysis of each unique stem, to determine the best place(s) to cut to optimize the yield, may be accomplished by manual scrutiny and figuring. However, technological advances, especially in the laser and optical sciences, facilitate mechanized and computerized scanning and analysis that is usually faster and more accurate. Such scanning devices typically fall into two categories: lineal scanning down the entire length of the stem, or transverse scanning by a plurality of scanners at select points along the stem. Historically, lineal scanning has generally been slower than transverse scanning, because it usually took longer for a lineal conveyor to move the stem past the lineal scanner; however, lineal scanning has usually been more accurate, and it requires less capital investment because it may be accomplished with only one scanner rather than a plurality. On the other hand, since the transverse scanning distance is so short (essentially the diameter of the trunk), it is usually the quickest scanning method, but the accuracy is never quite comparable to a linear scanner and usually requires several scanners having scanning fields that overlap to produce essentially one combined scanning field substantially the length of the stem.

As with stem scanning techniques, there are two well known methods of moving stems into position to be cut, and these methods are known as lineal flow and transverse flow. With lineal conveyors, each stem travels longitudinally (lengthwise) into a position where it is cut transversely (cross-sectioned) by an otherwise immobile saw or other cutting device; usually there is an endstop downstream of the saw, which stops the travel of the stem (at the desired length from the saw) long enough for the saw to cut it at the desired length. With the transverse flow method of conveyance (such as a slasher deck or log trimmer system), each stem is moved sideways up to a plurality of saws or cutting devices. The saw(s) of most transverse flow cutting systems do not move toward or away from the stem; the conveyor usually moves the stem to and through the saw(s), although the saw(s) may move along the longitudinal length of the stem to a position for a cut point within the range of its particular longitudinal field. However, physical space limitations make it difficult or impossible to position saws close enough to make several precise adjacent cuts; moreover, positioning enough saws at intervals along the stem to make all of the precise desired cuts essentially simultaneously would require the purchase and maintenance of many more saws than is generally economically feasible to utilize in this industry.

Both lineal and transverse conveyors experience variable speeds during use. Such variations generally depend upon a variety of circumstances effecting the conveyance such as the weight and size of the stem(s) being conveyed, the timing sequences needed to position the cutting apparatus for the desired cut(s), and the speed at which the stem can be conveyed away after being cut.

It is important in the sawing of stems that the cuts be made to maximize the quantity and quality of products yielded by each stem. These yields depend upon the length, diameter, configuration and quality of the stem. The best yield often requires cutting that takes into account the presence of curves, knots, defects and the like. The lineal method of bucking is generally better at maximizing the value and yield from the stem, especially if multiple saws can be synchronized to implement the precise pattern of unique cuts while the stem maintains its travel at acceptably high speeds. The transverse flow method is typically hampered in removing defects due to physical limitation of moving a multiplicity of saws closely enough together, or without employing a large number of cutting devices and repeated movements of the stem.

The following patents are arguably related to the patentability of the subject invention:

| U.S. Pat. No. | Issue Date | 1st Inventor |
| --- | --- | --- |
| 6,158,318 | December 2000 | Neimela |
| 6,089,135 | July 2000 | Murray |
| 6,032,564 | May 2000 | Bowlin |

-continued

| U.S. Pat. No. | Issue Date | 1st Inventor |
|---|---|---|
| 5,579,671 | December 1996 | Bowlin |
| 5,522,292 | June 1996 | Biagiotti |
| 5,243,889 | September 1993 | Wallis |
| 4,939,967 | July 1990 | Wallis |
| 4,640,160 | February 1987 | Hards |
| 4,616,542 | October 1986 | Hards |
| 4,468,993 | September 1984 | McCown, Et al |
| 4,391,170 | July 1983 | Boverman, Et al |
| 4,330,019 | May 1982 | Murphy, Et al |
| 4,204,798 | May 1980 | Warren, Et al |
| 4,085,638 | April 1978 | Fifer |
| 3,937,114 | February 1976 | Joensson, Et al |
| 3,919,906 | November 1975 | Law |
| 3,892,153 | July 1975 | Kato |
| 3,808,928 | May 1974 | Plegat |
| 3,178,974 | April 1965 | Roess |

U.S. Pat. No. 4,616,542 issued to Hards discloses a lineal bucksaw system for cutting a log while it is traveling lengthwise. This patented bucksaw apparatus includes at least one clamp for gripping the log and lifting it upward toward the saw blade moving downward from directly above it; combined downward movement of the saw blade and upward movement of the clamped log causes the saw blade to bisect the log. Such upward lifting is necessary whenever saw blade motion is directly downward on a horizontal workpiece such as a log. As the saw blade cross-sections the top portion of the log, the log's inherent horizontal support is being severed, and gravity causes the adjacent sectioned portions of the log to fall downward and inward toward the blade; as the saw blade cuts deeper into the log, both of the new log-segment ends being created by the cutting push together separated only by the saw blade, often binding the saw blade between them. The clamp is critical to the Hards bucking system.

U.S. Pat. No. 4,640,160 issued to Hards generally discloses a log bucking system for implementing log cutting as the log continues its lineal travel. The apparatus is constructed and operated in accordance with the teachings of the aforementioned U.S. Pat. No. 4,616,542. ('160 Patent, column 2 lines 33 to 39.)

Also known are so-called "shifting" saw systems. In these types of systems, a stem is stopped in its lineal travel, one or more saws are shifted to defined distances from the established "zero" end (beginning measuring point), then the multiple saws simultaneously cut the stem into logs and retract bforee the log can again begin its forward travel.

Many of the aforementioned patents disclose technology in fields other than the timber cutting field. These patents are included out of an abundance of caution, without any admission that they are in technological fields analogous to the present invention. Moreover, the present invention is distinguishable from most of those patents, which often involve making uniform cuts on a workpiece (such as pipe) having uniform dimensions, resulting in segments of uniform length or other uniform characteristics.

BRIEF SUMMARY OF THE INVENTION

In most general terms, the invention disclosed herein comprises (includes) a sawing mechanism traveling obliquely and parallel to a stem making transverse cuts without interrupting the longitudinal movement of the stem.

The invention disclosed herein is designed to use the lineal cutting method while overcoming the historical stoppage problem which occurs when segmenting the stem, by allowing the stem to continue its travel while it is being cut. Substantial slowing or stoppage of the conveyor(s) may cause movement of the stem thereon, and/or it may cause the cutting mechanism to otherwise lose synch with the stem being conveyed. This may cause the bucking system to lose its orientation vis a vis the stem, resulting in mis-cutting that either does not maximize the yield or actually prevents a stem from providing much usable wood. Furthermore, stopping and starting of the conveyor causes unnecessary wear and tear on the machinery.

This invention addresses the prominent problem associated with bucking stems having an infinite variety of sizes and shapes, caused by each stem's unique combination of length, diameters, sweep, knots, depressions, twists and other defects or irregularities associated with naturally grown timber. Since these irregularities can occur at any position down the length of a stem, lineal bucking affords the greater opportunity over transverse bucking by virtue of being able to remove either a defect or to cut the stem at the optimum locations. The lineal cutting method presents each point along a stem to the saw, whereas the number of saw presentation points along a stem in transverse bucking systems are limited by how closely saws can be positioned to each other down the length of the stem.

The invention disclose herein does not need any clamping devices, which are generally believed to be detrimental to efficient bucksawing for several reasons. Many tree trunks are too big and heavy to lift with any speed or stability; their inherent irregularities also hinder clamp gripping. Moreover, a clamping device will occupy valuable space, likely displacing one or more saw arms. Resting the stem on upraised flights or cradles atop the conveyor is recommended.

The invention may include a combination of the flying bucksaw system disclosed herein plus data gathering device (s) and computer hardware and software for analyzign such data and directing the synchronization of the bucksaw system. The invention may likewise include the above combination(s) including the conveyor(s).

One primary object of the present invention is to provide a saw system for cutting a stem continuously traveling lengthwise along a lineal conveyor.

Another primary object of the present invention is to provide methods of making and using a saw system for cutting a stem continuously traveling lengthwise along a lineal conveyor.

Another object of the invention is to provide an improved and efficient cutting system for maximizing the yield of wood from a stem.

Another object of the invention is to coordinate upstream systems for collecting stem data with a lineal saw system capable of making a plurality of desired cuts without stopping the travel of the stem.

Another object of the invention is to coordinate upstream conveyor systems with downstream conveyor systems, with the saw system described herein intermediate thereto.

Another object of the invention is to coordinate a plurality of modules comprised of upstream conveyor systems, downstream conveyor systems, and the saw system described herein intermediate thereto.

Other objects will be apparent from a reading of the written description disclosed herein, together with the claims.

Figure 1:
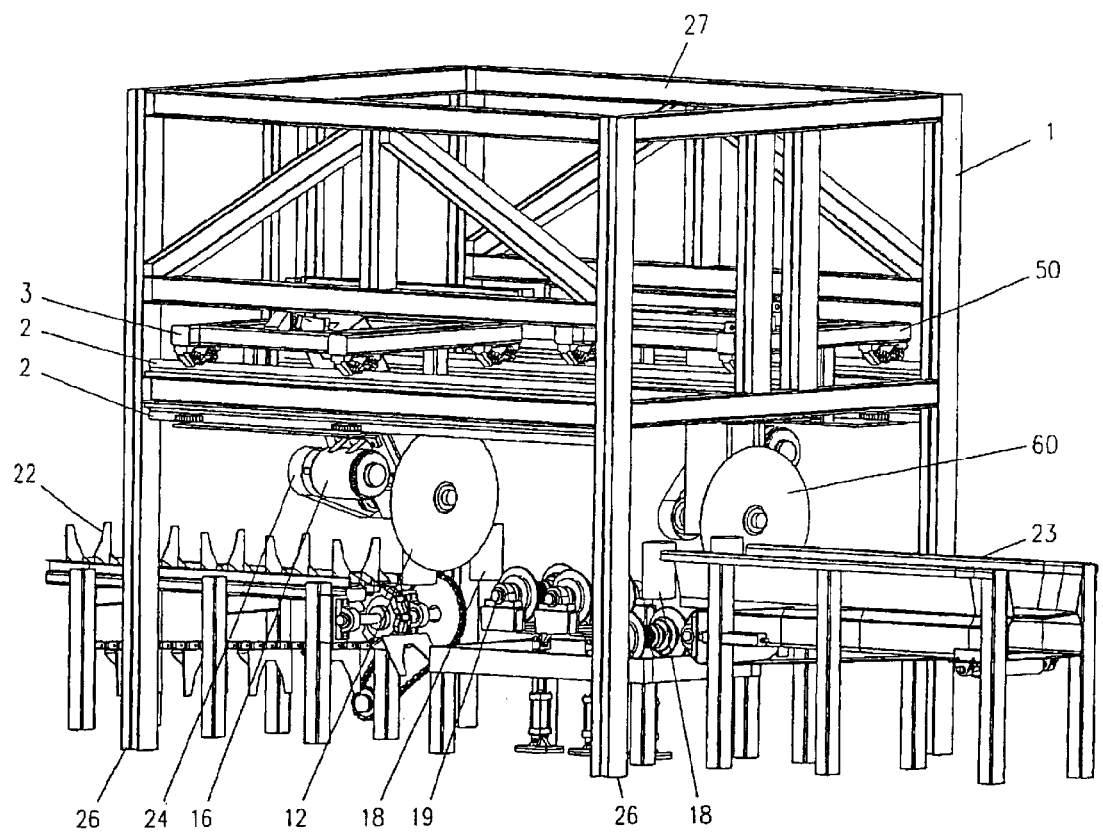
FIG. 1 depicts a isometric view of one version of the invention 40, including support frame 1, carrier assembly 50 and saw ladder 60 supported parallel and obliquely overhead of the longitudinal transports of an infeed (upstream) conveyor 22, the lower support roll(s) 19, the side support roll(s) 18, and an outfeed (downstream) conveyor 23. A second traveling saw apparatus with carrier assembly 50 and saw ladder 60 is also shown on the same support frame 1, mirror imaged to the opposite side of the longitudinal conveyor(s).
Figure 2:
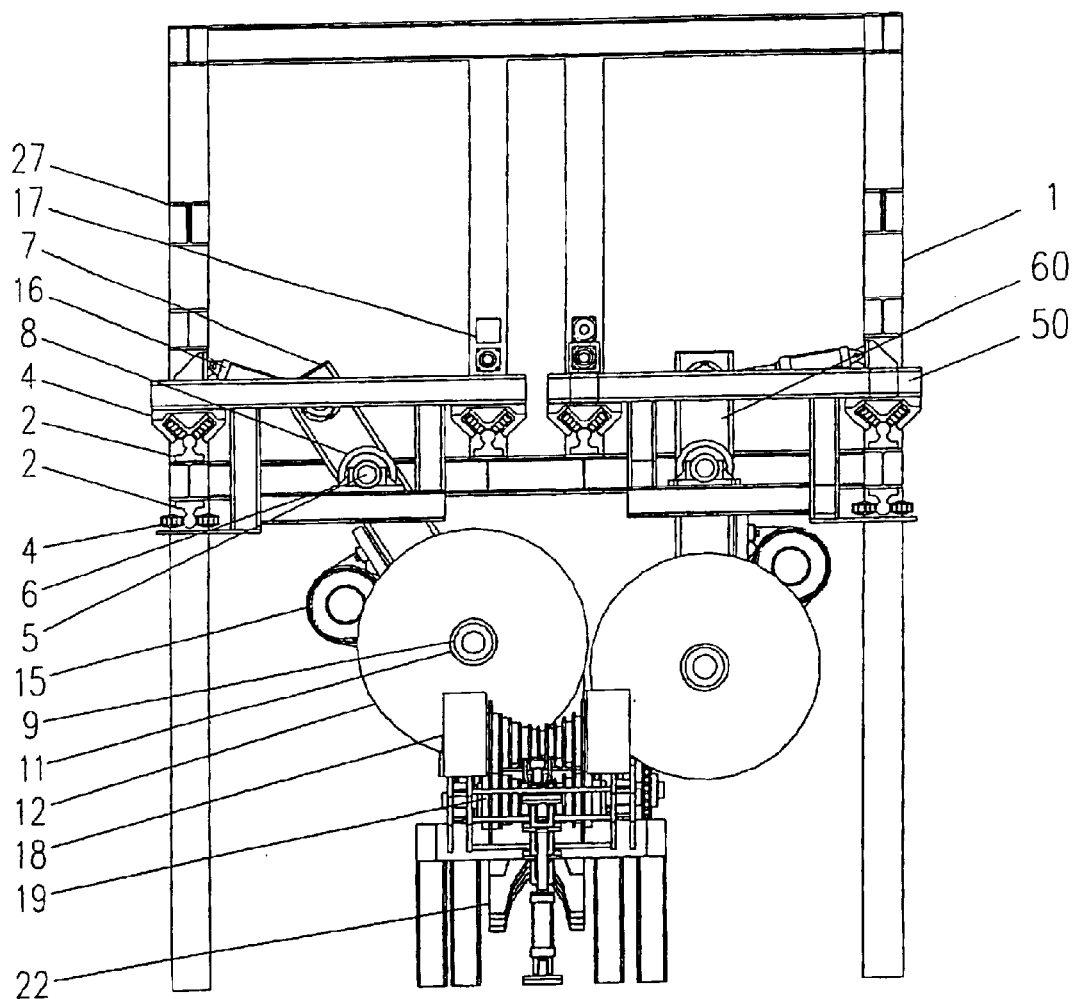

FIG. 2 depicts a back elevation view of the invention 40 of FIG. 1, viewed looking upstream from the downstream end (without the outfeed (downstream) conveyor 23); note that the carrier(s) 50 move into and out of the invention (into and out of the drawing page), and each saw ladder 60 with downwardly depending blade pivots pendulum-like toward and away from the infeed (upstream) conveyor.

Figure 3:
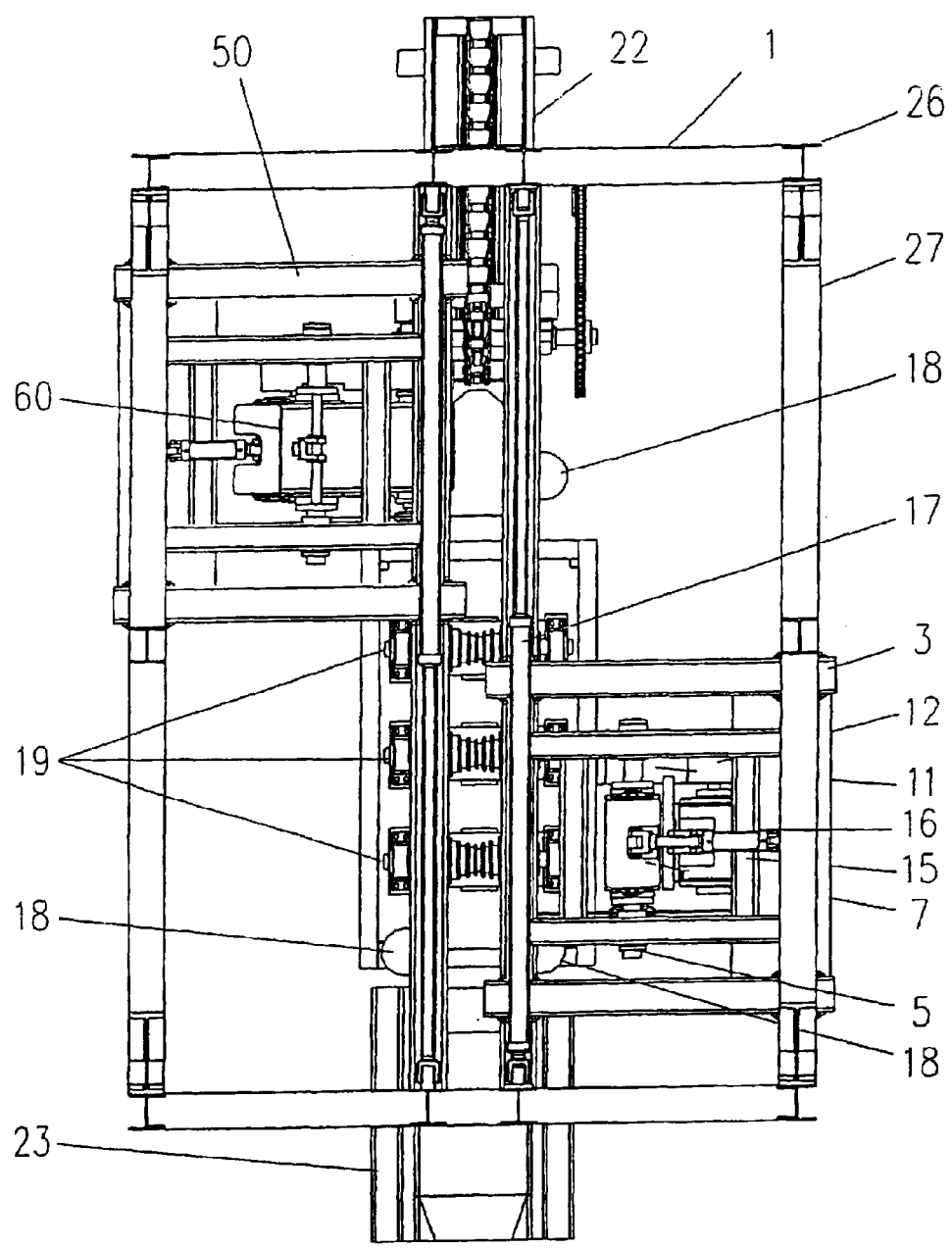

FIG. 3 depicts an overhead plan view of the invention 40 of FIG. 1.

Figure 4:
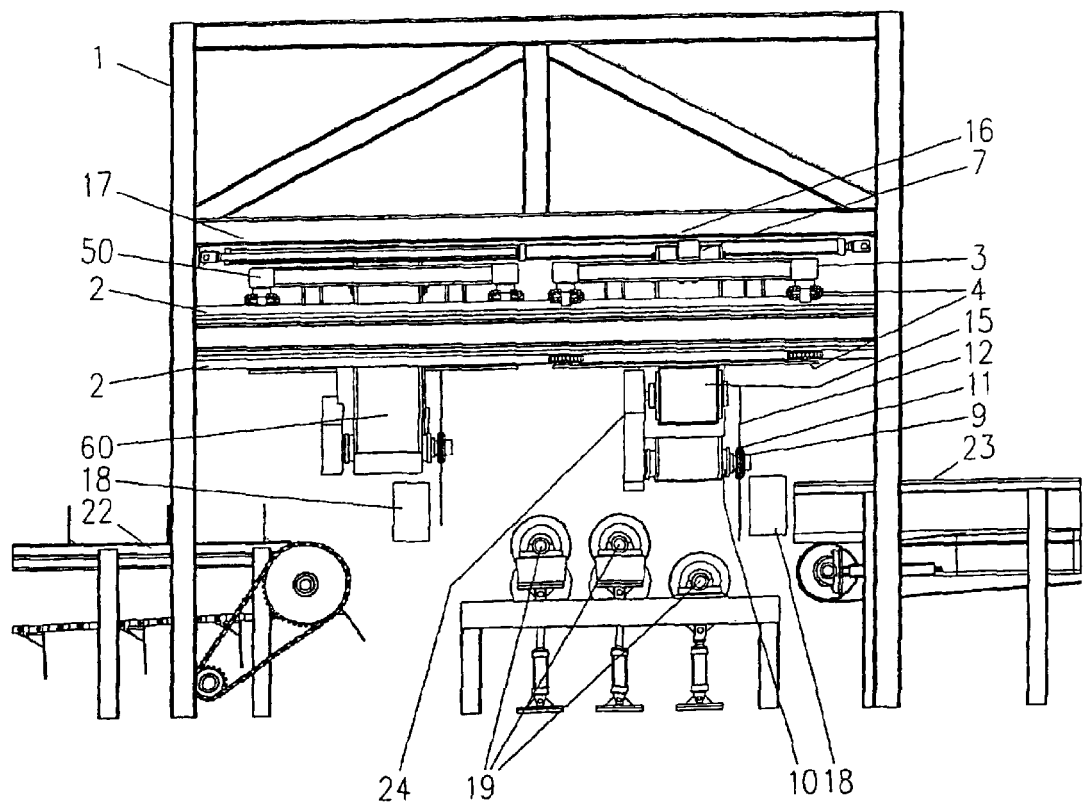

FIG. 4 depicts a side elevation view of the invention 40 of FIG. 1. All three of the support rollers depicted as items 19 are normally at rest in the most upstanding position; the uppermost and lowermost positions depicted represent the range of movement each of the three rollers 19 make in series as the blade 12 approaches, to avoid contact with the saw blade 12, bforee each support resumes its most upstanding position.

Figure 5:
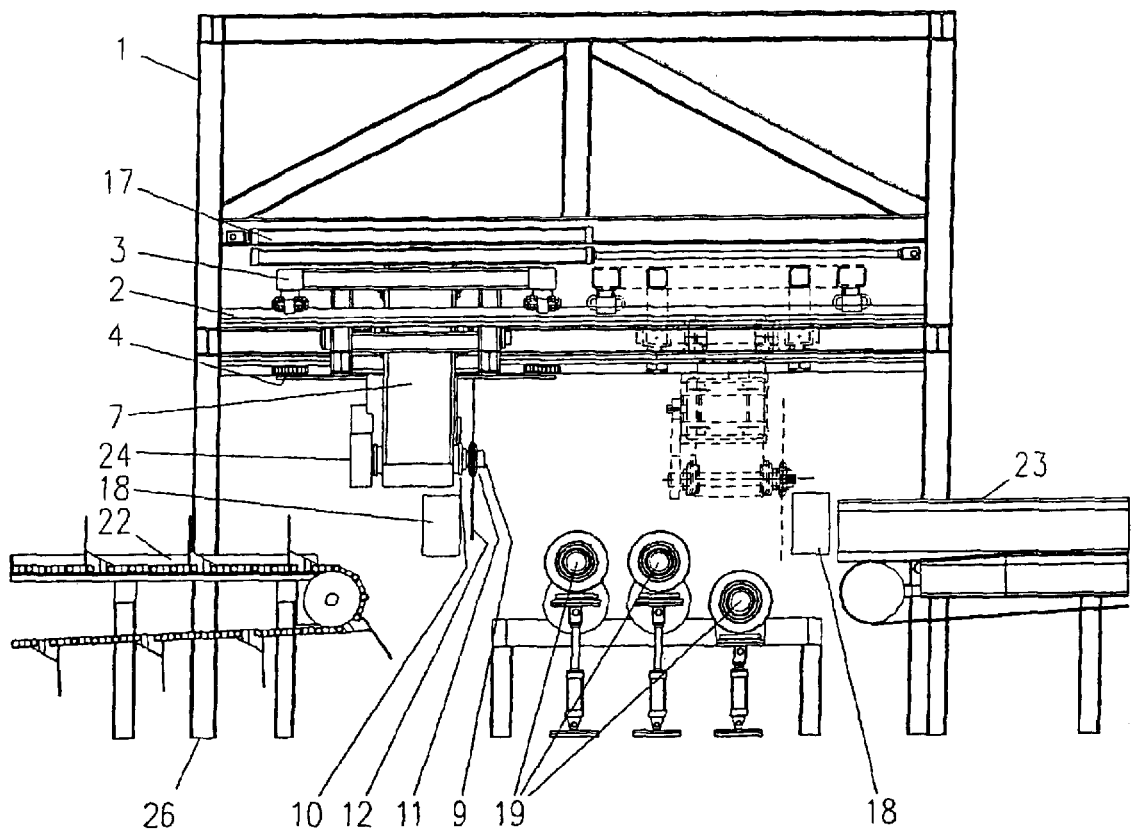

FIG. 5 also depicts a side elevation view of the invention 40 of FIG. 1, but shows the carrier 50, and the saw ladder 60 in the starting position and the extended position. The faded view of the assemblies in the extended position allows for component identification.

Figure 6:
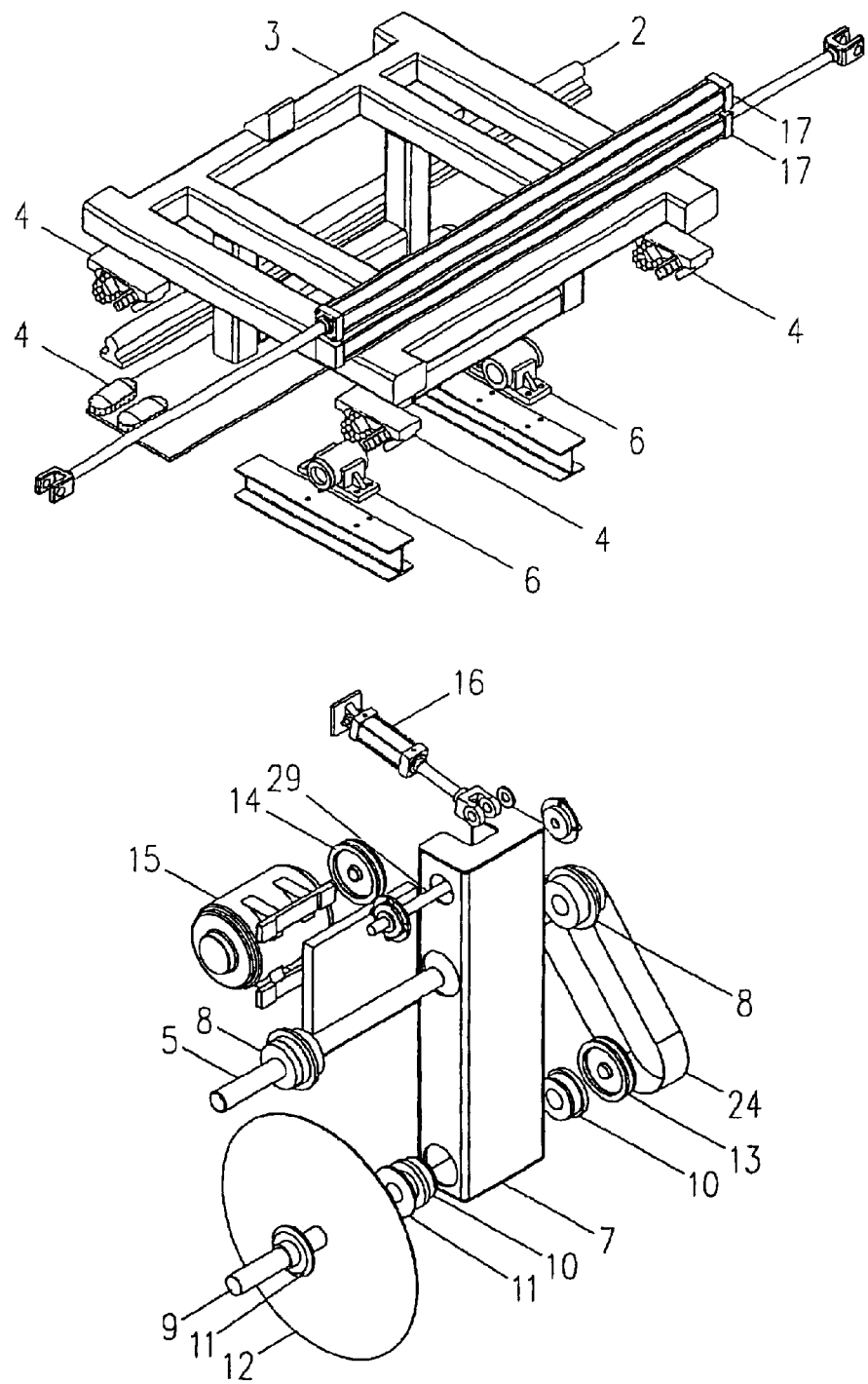

FIG. 6 depicts an exploded view of key aspects of the invention 40 of FIG. 1, without the support frame 1.

Figure 7:
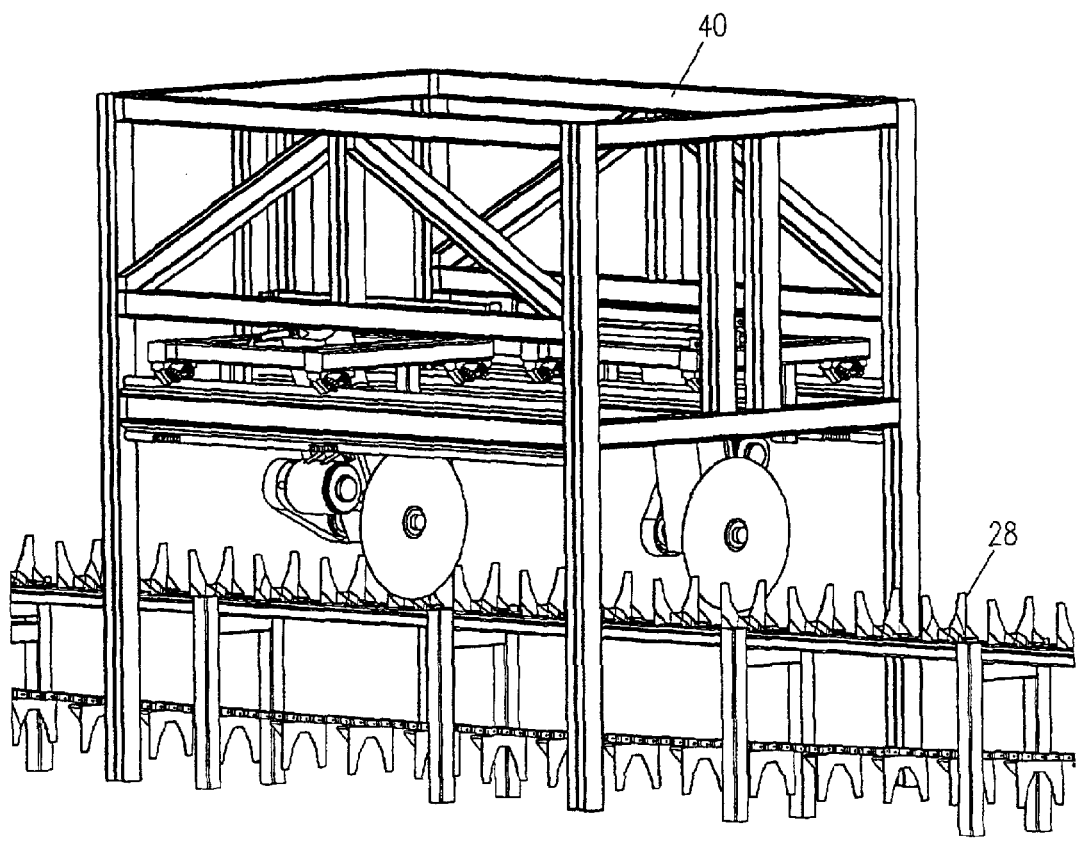

FIG. 7 depicts an isometric view of one version of the invention 40, including support frame 1, carrier assembly 50 and saw ladder 60 supported parallel and obliquely overhead of the longitudinal transports of a lineal conveyor 28. A second traveling saw apparatus 40 is also shown on the same support frame 1, mirror imaged to the opposite side of the longitudinal conveyor.

Figure 8:
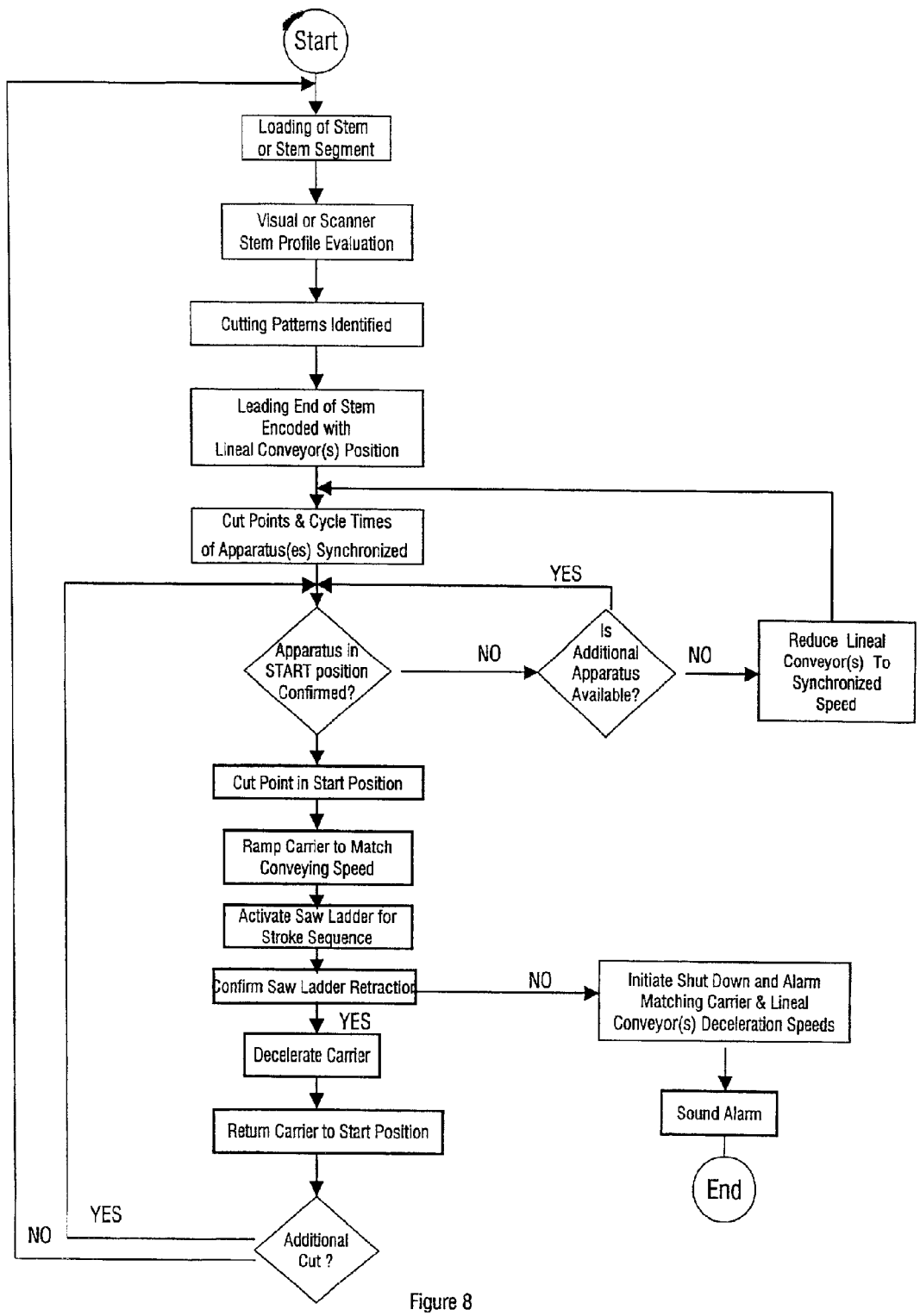

FIG. 8 depicts the operational steps of one version of the invention forming the basis of the method claims herein.

These drawings illustrate certain details of certain embodiments. However, the invention disclosed herein is not limited to only the embodiments so illustrated. The invention disclosed herein may have equally effective or legally equivalent embodiments.

DETAILED DESCRIPTION OF THE INVENTION

The claims of this invention are to be read to include any legally equivalent device or method. Bforee the present invention is described in detail, it is to be understood that the invention is not limited to the particular configurations, process steps and materials disclosed herein. It is also to be understood that the terminology used herein is not intended to be limiting, since the scope of the present invention will be limited only by the claims and equivalents thereof.

for the sake of simplicity and to give the claims of this patent application the broadest interpretation and construction possible, the following definitions will apply:

The word "stem" or derivative thereof essentially means a felled tree that has had its major limbs removed, essentially leaving the central trunk or main body, including any segment of the trunk or main body.

The word "upstream" essentially means toward the front or leading portion of the invention, as encountered from a conveyor system conveying to and through the lineal length of the invention.

The word "downstream" essentially means toward the back or ending portion of the invention, as encountered from a conveyor system conveying to and through the lineal length of the invention.

The word "synchronizing" or derivative thereof essentially means moving a saw assembly longitudinally "downstream" (from front to back) and/or "upstream" (from back to front) along the conveyor path of a stem, to position the saw assembly at the cut point and traveling at the same speed and direction as the stem, to make a desired cut of a stem without stopping its travel.

The word "saw" or derivative thereof essentially means a blade or other device capable of cutting into and/through a desired workpiece such as a stem or other wooden material.

The word "oblique" or derivative thereof essentially means not perpendicular to; in the context of a conveyor path or a stem aligned essentially horizontally lengthwise, oblique means not directly above (or not moving merely vertically to) the conveyor or stem, especially the midpoint thereof.

The word "fulcrumatic" or derivative thereof essentially means functioning as a fulcrum, essentially as a pivot point or support upon which a lever operates.

The phrase "sweep" or derivative thereof essentially means a curvature, bow, twist, or similar dforemity along a central axis of a stem.

The word "lineal" or derivative thereof essentially means linearly along or in the direction of the longitudinal length of a trunk, stem or conveyor.

The word "transverse" or derivative thereof essentially means perpendicular to the longitudinal axis of a trunk, especially in a direction essentially cross-sectioning a stem.

The word "bucking" or derivative thereof essentially means executing a cutting solution to convert a stem into desired longitudinal segments.

The word "log" or derivative thereof essentially means stem segments which require no further bucking to be processed by downstream equipment.

Also for the sake of simplicity, the conjunctive "and" may also be taken to include the disjunctive "or," and vice versa, whenever necessary to give the claims of this patent application the broadest interpretation and construction possible. Likewise, when the plural form is used, it may be taken to include the singular form, and vice versa.

The invention described herein is not limited by construction materials, so long as the materials used satisfy the structural or functional requirements without substantially undermining any other functional requirement of the system. Similarly, the invention disclosed herein may include functional elements capable of being satisfied by any one or combination of stated or unstated means of performing said function. for example (without limitation), the synchronization of the positioning and travel of a saw carrier may include any means facilitating the travel of the saw carrier(s) such as roundways with associated carrier wheels, tracks with associated carrier sleds, rack and pinion gearing, and combinations thereof.

Similarly, although hydraulic cylinders are disclosed as the primary means for ramping the carrier(s) travel into synchrony with the stem atop the conveyor, any other means will suffice so long as said means satisfy the functional requirements. Examples include (without limitation) lineal induction motors, direct current motors, wire cable motion systems, hydraulic cylinders, electric or hydraulic motors, and combinations thereof. Moreover, although a motorized circular saw blade is disclosed as the primary means for cutting a stem, any type of cutting means and means of mechanizing same will suffice so long as they perform the desired function without substantially undermining any other function of the invention. The same can be said for the means of actuating the cutting motion of the saw arm(s); although the primary disclosed means is a hydraulic actuating cylinder attached to the lever end of the saw arm, any means of urging the saw blade into and through the stem will suffice so long as the functional requirements are satisfied without substantially undermining any other functional requirements of the invention.

One form which the traveling bucking saw device may take is generally identified with the numeral 40. The major components of apparatus 40 are a structural frame 1, a saw carrier 50, and a saw ladder 60. The conveyor(s) are not critical to the device, but each should be lineal in nature so that the device is positioned parallel and obliquely adjacent to the stem conveying mechanism(s). Each saw carrier is designed to accelerate to match the speed of the lineal conveying device(s), allow time for the cut, decelerate, and then retract to its original position. A second carrier and "mirror imaged" saw ladder is depicted also in the Figures and can be operated in the same manner, but on the opposite side of the stem.

One basic version of the invention includes (comprises) a saw system for cutting a stem continuously traveling lengthwise along a lineal conveyor, said saw system comprising means for synchronizing the positioning of a saw with the travel of the stem so that said saw will be positioned to cut the stem at the desired cut point without stopping stem travel, and means for urging said saw essentially obliquely through the stem.

As a more particular version of the saw system described herein, said saw urging means may further include a cutting arm having an upper end and a lower end, and pivotally supported obliquely above the lineal conveyor path, said lower end including said saw. The synchronizing means may further include means for lineally carrying said urging means to a cut point. Said lineal carrying means may further include a saw carrier pivotally supporting said cutting arm obliquely above the lineal conveyor path, and movable along the lineal conveyor path. Said lineal carrying means may further include a frame riding along at least one lineal track. Moreover, said synchronizing means may further include means for actuating lineal carrier travel, and control means for directing the amount and timing of said actuation and travel.

More particularly, the invention disclosed herein may include a saw system for cutting a stem continuously moving lengthwise along a lineal conveyor, including saw carrier means comprising a support frame movably supported on at least two lineal tracks each aligned at least obliquely above a different longitudinal side of the lineal conveyor path and each supporting an upper carrier frame having a lower carrier frame downstanding therefrom; said upper carrier frame may include roller means for riding along said lineal track. Said lower carrier frame may include means for pivotally supporting a cutting lever arm obliquely above the lineal conveyor path.

Furthermore, another version of the invention may include at least two independent saw means each comprising said cutting leverage arm having an upper lever end, a lower cutting end, and said pivotal support fulcrumatic therebetween and obliquely above a different longitudinal side of the lineal conveyor path; said lower cutting end may include a saw, said upper lever end connected to one end of an urging means attached to said carrier frame.

Another version of the invention may include control means synchronizing the positioning of said saw with the travel of the stem so that said saw will be positioned to cut the stem at the desired cut point without stopping stem travel.

With respect to said saw carrier means, said support frame may include at least two pairs of lineal tracks each aligned parallel to each other and at least obliquely above and parallel to a different longitudinal side of the lineal conveyor path. Each lineal track may include an upstanding roundway rail, and each pair of lineal tracks supporting an upper carrier frame may have a lower carrier frame downstanding therefrom. Said upper carrier frame may include at least one pair of downstanding rollers, each roller in cooperating relationship with a different upstanding roundway rail for travel thereupon. Said pivotal support of said cutting leverage arm on said lower carrier frame may include a saw pivot shaft with support bearing(s).

In another version of the invention, each such cutting lever arm may include a saw ladder frame supporting at said lower cutting end a saw arbor with bearing(s). Said upper lever end of said saw ladder frame may support attachment of a hydraulic expansion cylinder having an opposite end attached to said upper carrier frame, for urging said lower cutting end essentially obliquely through the stem.

Yet another version of the invention may include control means comprising an upstream lineal stem scanner/optimization system, including means for transmitting data concerning one or more physical characteristics of the stem. It may also include means for encoding entry of the leading end of the stem into the saw system. Besides any necessary hardware or other equipment for accomplishing the control functions, the control means may also include computer programing for processing said data received from said scanner/optimization system (including the stem's lineal position on the conveyor, its optimum cut points, and its travel speed), and/or computer programing for synchronizing the positioning of said saw with the travel of the stem and/or computer programming synchronizing cutting while a cut point is over a gap between two aligned conveyor systems.

Other control means may include computer programming synchronizing cutting while a cut point is over rollers between two longitudinally aligned conveyor systems. Alternatives also include computer programming synchronizing retraction of said cutting blade from the stem. Other alternatives include computer programming synchronizing deceleration of said saw carrier, and return to its starting position, and/or computer programming synchronizing subsequent cuts on a stem without stopping its travel.

The invention disclosed herein includes one or more saws and a sawing system capable of moving along a conveying device until matching the same speed as a "branch-trimmed" tree stem on a lineal conveyor, then cutting logs of desired lengths, bforee returning to the starting position to again begin moving along the conveying device for another cut. One or more independently moving saw carriers, each obliquely positioned adjacent a stem, are deployed to make the cuts into the stem and then re-position for another cut in the same stem or a trailing stem. More than one sawing system can be deployed down the length of the lineal conveying system, if required by the number and timing of the desired cuts.

In the version(s) of the invention depicted in the drawings, the frame (upon which each saw carrier assembly moves) includes support beams capable of accommodating at least two parallel pairs of roundway rails situated longitudinally along respective inner and outer longitudinal support beams. Each carrier assembly includes a pivoting arm (depicted as the "saw ladder") mounted via a pivot shaft; each pivot arm carries a motorized saw with blade downwardly depending, the arm being swung into cutting position (and back to resting position) by a powered hydraulic cylinder.

In this particular version of a saw system, longitudinal travel of each carrier is parallel to the conveyor path, but not directly above the center point of the conveyor path. Longitudinal travel may be accomplished by a hydraulic linearly aligned piston capable of relatively quickly matching the speed of the stem (traveling on the conveyor), by quickly pushing its carrier to the cut point. The cut is made by the circular saw blade while the carrier is traveling longitudinally at the same speed as the stem. Also during such synchronized traveling, the saw blade is retracted from the cut point bforee its carrier is decelerated, and the hydraulic piston pulls the carrier back to its starting position. Longitudinal travel of the carrier may also be accomplished using an AC variable frequency drive motor or similar means, in place of the hydraulic cylinder, where the carrier's travel and positioning can be accurately controlled. Computer software governs the travel of each carrier and the positioning of each saw, and (to the extent necessary) coordinates the relative speed(s) of the conveyor(s) in addition to the positioning of each stem thereon.

The travel track of the carrier is depicted with roundways, but it can use tracks, rails or similar mechanisms to allow the carrier to move parallel with the stem. It is possible to cut the logs from the stem while it is positioned upon the lineal conveying device (especially a conveyor with a plurality of upstanding flights or cradles supporting each stem), or when the stem passes between a gap between successive lineal conveyors aligned end to end. The circular saw blade can be powered either electrically, hydraulically, by the combustion of organic material, or any other means of mechanizing the saw blade.

Ideally the apparatus would be used in an automatic stem cutting mode using an upstream scanner and optimization system to determine the physical characteristics of each incoming stem in their respective sequence of flow. A computer receives the scanned information to determine the optimum cut locations along the stem to produce logs, poles, plyblocks or the like. Alternatively, the cut point or other synchronizing directives maybe be determined manually.

With respect to the version of the invention depicted in FIG. 1, the structural frame 1 includes braced columns 26, arranged properly for clearance around the lineal conveying device(s) 19, 22, 23; the columns are connected to braced longitudinally extending members 27 spanning obliquely parallel to the path of the stem to be cut, allowing the carrier 50 to run within the structural frame 1 without obstruction. In the depicted embodiment, the saw carrier 50 is mounted on roundways 2 (that may be constructed of pipe or solid steel) using linear bearings 4 or contoured wheels to trap the roundways 2 within each linear bearing 4 or pair of contoured wheels so that the carrier 50 is held securely whenever the saw ladder 60 extends the circular saw blade 12 and cuts. The roundways depending downwardly from the outer columns also function to resist the upwardly directed force (or tipping moment) created when the cutting arm is urging the saw blade into the stem. Although the Figures do not depict any roundways depending downwardly from any vertical column or horizontal span suspended above a cutting arm, such roundways may be added to similarly resist any opposite tipping moment such as that may arise during the retraction of the saw blade from the stem.

The carrier 50, in the depicted Figures, utilizes a linear positioned hydraulic piston 17 to accelerate the carrier 50 until it matches the speed of the lineal conveying device(s) 19, 22, 23, and then another hydraulic piston 16 extends the saw ladder 60 allowing the circular saw blade 12 to cut the stem bforee the same piston 16 retracts the saw ladder 60 and the carrier 50 is decelerated. The carrier's lineal positioned hydraulic piston 17 is then used to return the carrier to its starting position. An electric or hydraulic saw motor 15 is used to power the circular saw blade 12 of each saw ladder 60. Although its not necessary to the success of the device, the preference would be to use a linear positioned hydraulic cylinder for the hydraulic piston 16 depicted in the Figures for the saw ladder's 60 movement. Additionally, the carrier's travel can be accomplished by AC variable speed drives or similar technology in the place of the linear positioned hydraulic piston 17.

The saw carrier 50 as depicted in the Figures utilizes a frame 3 mounted onto the carriage roundways 2 with either linear bearings 4 or contoured wheels to allow travel obliquely parallel to the stem. The saw ladder 60 rides pivotally attached by the saw ladder mounting hubs 8 to the saw carrier frame 3, with the saw ladder frame 7 pivoted and mounted on the saw pivot shaft 5. The saw pivot shaft 5 is supported at either end onto the carrier frame 3 by the saw pivot shaft support bearings 6. The saw arbor 9 is rotably housed in the lower end of the saw ladder frame 7, mounted with arbor support bearings 10; the saw blade 12 is attached to the end of the arbor using saw collars 11. The saw arbor 9 depicted is powered by an electric saw motor 15. Power is transmitted from the motor sheave 14 through a guarded drive belt 24 to the arbor sheave 13, which is mounted on the saw arbor 9. The saw motor 15 base is mounted to the saw arbor frame 7. The saw ladder 60 assembly is pivoted into and out of the cutting of a stem by a hydraulic cylinder 16 that has one end connected to the saw ladder frame 7 and the opposite end connected to the carrier frame 3.

FIGS. 1 through 5 depict the lineal conveying devices as an infeed conveyor 22, an optional separate outfeed conveyor 23, an optional series of supporting rolls 19, and optional side supporting rolls 18. FIG. 7 depicts the lineal conveying device as a single conveyor 28, with the traveling saw apparatus 40 mounted obliquely above and parallel to the transfer of stems. However, none of the lineal conveying devices are critical to the traveling saw apparatus 40 disclosed herein.

Besides the above described versions of the invented apparatus, the invention further includes a method of making a saw system for cutting a stem continuously traveling lengthwise along a lineal conveyor, comprising the steps of providing a saw system described hereinabove. The method of making item 40 has been described hereinabove, Additionally, the method may include the steps of aligning the upstream end of at least a second of said saw systems a sufficiently short distance directly downstream of the downstream end of a first of said saw systems so that an unusable portion cut from the stem will fall between said short distance without further delaying the conveyance of a succeeding stem segment that is usable.

Besides the above described methods of making and installing, the invention includes a method of sawing a stem continuously traveling lengthwise along a lineal conveyor.

Said sawing method may include the steps of synchronizing the positioning of a saw with the travel of the stem so that said saw will be positioned to cut the stem at the desired cut point without stopping stem travel, and actuating means for urging said saw essentially obliquely through the stem, as described more fully hereinabove.

Additionally, as described more fully hereinabove, said synchronizing may include processing data of the physical characteristics, optimum cut points, location and travel speed of a stem, determining entry of the leading end of the stem into the saw system, and ramping a saw carrier speed to match the stem travel at the cut point. It may further include actuating deceleration of said saw carrier, and return to its starting position. Also included may be the step of synchronizing subsequent cuts on a stem without stopping its travel.

In another version of the sawing method described herein, a plurality of saw systems are aligned lineally.

Those skilled in the art who have the benefit of this disclosure will appreciate that it may be used as the creative basis for designing devices or methods similar to those disclosed herein, or to design improvements to the invention disclosed herein; such new or improved creations should be recognized as dependant upon the invention disclosed herein, to the extent of such reliance upon this disclosure.

We claim:

1. A saw system for cutting a stem continuously moving lengthwise along a lineal conveyor, said saw system comprising:
   a. saw carrier means comprising a support frame movably supported on at least two lineal tracks each aligned at least obliquely above a different longitudinal side of a lineal conveyor path and each supporting an upper crier frame having a lower carrier frame downstanding therefrom, said upper carrier frames including roller means for riding along said lineal tracks, said lower carrier frames including means for pivotally supporting a cutting lever arm obliquely above the lineal conveyor path;
   b. at least two independent saw means each comprising said cutting leverage arm having an upper lever end, a lower cutting end, and said pivotal supports fulcrumatic therebetween and obliquely above a different longitudinal side of the lineal conveyor path, said lower cutting end including a saw, said upper lever end connected to one end of means, attached to said carrier frames for urging said saws essentially pendularly through the stem; and
   c. control means synchronizing a positioning of said saws with the travel of the stem so that said saw will be positioned to cut the stem at a desired variable cut point without stopping stem travel.

2. A saw system described in claim 1 hereinabove, wherein, with respect to said saw carrier means, said support frame comprising at least two pairs of lineal tracks each aligned at least obliquely above a different longitudinal side of the lineal conveyor path, each lineal track comprising an upstanding roundway rail and each pair of lineal tracks supporting one of the upper carrier frames having the lower carrier frames downstanding therefrom, said upper carrier frames including at least one pair of downstanding rollers each in cooperating relationship with a different upstanding roundway rail for travel thereupon, said means for pivotally supporting the cutting lever arm on said lower carrier frames comprising a saw pivot shaft with support bearing.

3. A saw system described in claim 1 hereinabove, wherein each cutting lever arm comprising a saw ladder frame supporting at said lower cutting end a saw arbor with bearing, said upper lever end of said saw ladder frame supporting attachment of a hydraulic expansion cylinder having an opposite end attached to said upper carrier frames for urging said lower cutting end essentially obliquely through the stem.

4. A saw system described in claim 1 hereinabove, wherein said control means comprises:
   a. an unstream lineal stem scanner and optimization system, including means for transmitting data concerning a physical characteristic of the stem;
   b. means for encoding entry of a leading end of the stem into the saw system;
   computer for processing said data received from said scanner and optimization system, including the stem's lineal position on the conveyor, its optimum cut points, and its travel speed; and
   d. computer programming for synchronizing the positioning of said saw with the travel of the stem.

5. A saw system described in claim 4 hereinabove, said control means further comprising computer programming synchronizing cutting while a cut point is over a gap between two aligned conveyor systems.

6. A saw system described in claim 4 hereinabove, said control means further comprising computer programming synchronizing cutting while a cut point is over rollers between two aligned conveyor systems.

7. A saw system described in claim 4 hereinabove, said control means further comprising computer programming synchronizing retraction of said cutting blade from the stem.

8. A saw system described in claim 4 hereinabove, said control means further comprising computer programming synchronizing deceleration of said saw carrier means, and return to its starting position.

9. A saw system described in claim 4 hereinabove, said control means further comprising computer programming synchronizing subsequent cuts on the stem without stopping its travel.

* * * * *